United States Patent Office 3,215,154
Patented Nov. 2, 1965

3,215,154
METHOD OF REDUCING FRICTION LOSS IN FLOWING HYDROCARBON LIQUIDS
Jerry L. White and Daniel L. Gibson, both of Tulsa, Okla., assignors to The Dow Chemical Company, Midland, Mich., a corporation of Delaware
No Drawing. Filed Apr. 13, 1962, Ser. No. 187,212
4 Claims. (Cl. 137—13)

This invention relates to a method of decreasing friction loss in flowing hydrocarbon liquids. More particularly, it relates to an additive which when intermixed with a hydrocarbon liquid will reduce the friction loss in the transfer of the liquid by fluid flow.

In the process of transferring liquids by fluid flow, it is well known that energy must be expended to overcome friction encountered in the movement of the liquid. When a fluid is pumped under pressure, this loss is generally apparent as a pressure drop along the conduit. Such pressure drops are particularly large under conditions wherein the liquid velocity has exceeded the critical limit for smooth laminar flow. The problem of high friction loss caused by nonlaminar flow is frequently met in industrial operations where high fluid velocities are essential, such as in oil well fracturing treatments or in the rapid movement of large volumes of liquid for considerable distances as in a petroleum pipe line.

To compensate for this friction loss, considerable energy must be expended. Obviously, a reduction in friction loss would permit lower operating pressures and reduced power requirements, or alternatively, an increased flow rate under the original pumping conditions. Thus, a method whereby the friction loss in the flow of hydrocarbon liquids can be appreciably reduced is greatly desired.

The use of metallic soaps and other materials as thickeners for gasoline and other hydrocarbon liquids is well known. If large quantities of such thickeners are used, the liquid may be converted into a non-Newtonian thixotropic gel. In U.S. Patent 2,492,173, issued December 27, 1949, Mysels disclosed that the flow rate of gasoline in a pipe could be increased by transforming it into such a thixotropic gel by adding a sufficient quantity of an appropriate thickener prior to its introduction into the pipe line. At the point of destination the thickener is removed to recover the gasoline.

It is an object of the present invention to provide a method for the reduction of friction loss resulting from the flow of a hydrocarbon liquid without causing appreciable thickening of the liquid by intermixing with the liquid a small amount of a high molecular weight polyisobutylene resin. A further object is to provide an improved method for the transfer of hydrocarbon liquids by pumping whereby the pressure drop due to fluid flow is appreciably decreased.

The above and other objects are attained according to this invention by intermixing with the hydrocarbon liquid a small amount, generally less than 0.5 wt. percent based on the hydrocarbon liquid, of high molecular weight polyisobutylene resins. As described more fully below, a 72 percent reduction in pressure drop was obtained by addition of as little as 0.25 pound of polyisobutylene resin to 1,000 gallons of kerosene, an additive concentration of less than 0.004 wt. percent.

High molecular weight polyisobutylene resins have been prepared commercially for sometime by the low temperature, acid-catalyzed polymerization of isobutylene. Chemically the resin is a long chain linear aliphatic hydrocarbon consisting of the following repeating units:

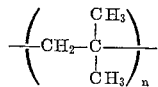

and having, except for one terminal double bond, a completely saturated structure. These resins are completely soluble in the usual hydrocarbon solvents, thus establishing the absence of more than a trivial amount of cross-linking. The polymer is considered amorphous in the unstretched state, but on stretching it develops a high degree of crystallinity.

Although a significant reduction in friction loss is observed with a polyisobutylene resin having a viscosity average molecular weight as low as 0.7 million, it is recommended that a resin having a viscosity average molecular weight in the range of 1 million to 15 million and preferably in the range of 4 million to 10 million be employed. This viscosity average molecular weight of the polyisobutylene resin is determined from intrinsic viscosity data using the conventional relationship:

$$[\eta] = K'\overline{M}^a$$

wherein $\eta$ is the intrinsic viscosity, $K'$ and $a$ are constants and $\overline{M}$ is the viscosity average molecular weight (P. J. Flory, "Principles of Polymer Chemistry," Cornell University Press, 1953, p. 310).

While a number of known polymers may be added to hydrocarbon liquids as thickeners, few have been effective in the reduction of friction loss. In fact, only natural rubber approaches the effectiveness of the specified polyisobutylene resin. However, to achieve an equivalent reduction in pressure drop natural rubber requires a 5 to 10 times greater concentration. A further advantage of the polyisobutylene additive is found in its superior thermal and oxidative stability. While this stability may not be crucial for short periods of time, it is known that other polymers which may be used for friction loss reduction frequently degrade during storage or on exposure to high temperature and that such degradation is detrimental to this use. The polyisobutylene resin is unaffected by similar conditions. This thermal stability is important not only because of storage requirements, but also because temperatures ranging from below 0° F. to 120° F. or higher may be encountered in pipe line transmission and in oil well operations.

Also of crucial importance for use in well-treating operations is the compatibility of the polyisobutylene additive with the standard well-treating agents.

In addition to the above advantages, the polyisobutylene resin is essentially gel-free. In contrast, natural rubber is known to contain an appreciable insoluble gel portion, a portion which may be from 10 to 25 percent by weight in the case of unmilled pale crepe rubber. This gel content does not contribute to the friction loss reduction and indeed may be an undesirable contaminant, particularly when solid-free liquids are desired as in pipe line transmission.

In the practice of this invention, a polyisobutylene resin having a viscosity average molecular weight of at least 0.7 million and preferably in the range from 4 million to 10 million is intermixed with a hydrogen liquid in an amount from 0.01 to 25 pounds of resin per 1,000 gallons of hydrocarbon liquid. The optimum amount of resin will vary depending on the molecular weight of the polymer and the flow conditions of the liquid. However, appreciable and economically valuable reduction in friction loss under conditions of turbulent flow may be achieved with as little as 0.01 to 0.45 pound of polyisobutylene resin per 1,000 gallons of hydrocarbon liquid. Particularly for a well-treating fluid which may contain sand and other propping agents, it is preferable to use a somewhat larger amount of the resin in the range of from 1 to 10 pounds per 1,000 gallons. Under other conditions still higher concentrations of the additive up to about 25 pounds per 1,000 gallons are useful. But above this level the viscosity of the treated fluid increases to the extent that it is frequently undesirable.

In the practice of this invention, the polyisobutylene resin may be intermixed directly with the hydrocarbon liquid as a shredded, pulverized, or ground solid, preferably having a particle size of 40 U.S. standard screen scale or finer. However, the rate of solution may be slow. Thus, it is often preferable to use an additive concentrate prepared by dissolving the resin in kerosene or other suitable liquid. To increase the rate of solution the concentrate mixture can be heated up to about 200° F. if desired without detrimental effect on subsequent friction loss reduction. However, polyisobutylene is known to decompose at temperatures above 375–400° F.

As an example of a particularly effective embodiment of this invention for field operations, a mixing tank is charged with 978 gallons of kerosene. Then, 250 pounds of a commercial polyisobutylene resin, having a viscosity average molecular weight in the range of 6.2 million to 8.4 milion and preground to a particle size of about 10–20 U.S. standard screen scale, is added slowly to the kerosene with sufficient stirring to insure an even dispersion of the resin. Stirring is continued until the solution attains sufficient viscosity to keep the undissolved resin particle dispersed, about 2 hours being required. The concentrate may then be transferred to storage even though another 3–5 hours may be required for complete solution of the polyisobutylene resin. The resulting viscous kerosene concentrate may be stored for at least 2 months without visible detrimental effects. At the time of use this viscous concentrate may be further diluted by blending it with 3 or 4 times its volume to the liquid to be treated, thus giving a more fluid material which can be readily and uniformly intermixed in the desired amount with the bulk of the hydrocarbon liquid using standard batch or continuous methods.

The term, hydrocarbon liquid, as used herein refers to those hydrocarbons and mixtures thereof which are characterized by: (1) being a liquid at 80° F. and 1 atm. pressure, (2) having a viscosity between 0.2 and 150 cps. at 80° F. and (3) having sufficient solvency to dissolve the desired amount of polyisobutylene resin. Typical examples of such hydrocarbon liquids are pentane, cyclohexane, isooctane and toluene; and petroleum products such as crude oil, gasoline, kerosene and fuel oil.

The invention herein described relates to a method for reduction of friction loss when a hydrocarbon liquid is moved under conditions of nonlaminar flow. These conditions may be characterized by use of the generalized Reynolds number described by D. W. Dodge and A. B. Metzner (A. I. Ch. E. Journal, 5, 189 [1959]). It is defined as:

$$N'_{Re} = \frac{D^{n'}V^{2-n'}\rho}{g_c K'(8)^{n'-1}}$$

where:

D is the diameter of the wetted perimeter of the conduit,
V is the main linear velocity,
$\rho$ is the fluid density,
$g_c$ is a dimensional conversion factor,
$K'$ is the fluid consistency index, and
$n'$ is the flow behavior index.

The values for $K'$ and $n'$ are determined experimentally for a given fluid from the relationship of shear stress and shear rates as defined in the equation:

$$\text{Shear stress} = K' (\text{shear rate})^{n'}$$

On the basis of the generalized Reynolds number as defined above, sufficient fluid turbulence is obtained whenever the generalized Reynolds number is above $3 \times 10^3$ to cause an appreciable friction loss which may be reduced by treatment of the hydrocarbon fluid with the disclosed polyisobutylene resin. At flow rates which result in a generalized Reynolds number of $1 \times 10^4$ to $5 \times 10^5$ the polyisobutylene resin additive is particularly effective in reducing the friction loss. But at higher velocities the efficiency of the additive gradually decreases so that no material advantage is gained by using the polymer at velocities such that the Reynolds number is above $1 \times 10^7$.

In order to demonstrate the improved results attained through the use of polyisobutylene in accordance with the process of the invention, and to provide a reliable means for comparing the efficiency of various materials as friction loss reduction additives, a recirculating test system was employed under the following conditions:

Test section: 0.215 inch I.D. stainless steel tubing with pressure taps located 9 ft. apart
Test fluid: kerosene ($\rho = 0.805$–$0.815$ g./ml.)
Pressure drop with kerosene: 100 p.s.i.
Temperature: $75 \pm 1°$ F.

To obtain the desired 100 p.s.i. test pressure drop with untreated kerosene required a flow rate of $4.40 \pm 0.05$ g.p.m at 75° F. Under these conditions a Reynolds number of about 26,000 is obtained with a fluid velocity of 39 ft./sec. and a shear rate of 17,350 sec.$^{-1}$. Then a sufficient amount of an additive concentrate in kerosene, prepared as described above, is intermixed with the flowing test fluid to give the desired additive concentration. The resulting flow rate and pressure drop are recorded within 1 minute of adding the concentrate, about 30 seconds being sufficient to obtain satisfactory blending and a steady pressure drop.

To illustrate further the utility of the present invention, the following examples are presented. In these examples, the test procedure described above was used.

EXAMPLE 1.—POLYISOBUTYLENE AS A FRICTION LOSS REDUCTION ADDITIVE

The following data were obtained using commercial polyisobutylene (PIB) having several viscosity average molecular weights.

| Additive | Viscosity, Average Molecular Weight $\times 10^{-6}$ | Percent Reduction in Pressure Drop—Lbs. Polyisobutylene Per 1,000 Gals. Kerosene | | | | | | | | |
|---|---|---|---|---|---|---|---|---|---|---|
| | | 0.01 | 0.025 | 0.05 | 0.1 | 0.25 | 0.5 | 1.0 | 2.5 | 25.0 |
| PIB-1 | 6.2–8.4 | 11 | 22 | 41 | 55 | 73 | 73 | 73 | 73 | 60 |
| PIB-2 | 6.2 | ----- | 19 | ----- | 48 | ----- | 74 | 74 | 72 | ----- |
| PIB-3 | 1.9–2.3 | 6 | ----- | 16 | 27 | 37 | 46 | 54 | 61 | 64 |
| PIB-4 | 1.4–1.9 | 3 | ----- | 10 | 15 | 25 | 32 | 42 | 49 | 61 |
| PIB-5 | 1.1–1.4 | 3 | ----- | 10 | 14 | 21 | 29 | 37 | 49 | 61 |
| PIB-6 | 0.7–1.1 | 2 | ----- | 7 | 10 | 17 | 24 | 32 | 39 | 52 |

EXAMPLE 2.—EFFECT OF TEMPERATURE ON FRICTION LOSS REDUCTION WITH POLYISOBUTYLENE

| Test T. ° F. | Percent Reduction in Pressure Drop—Lbs. PIB-1/1,000 Gals. Kerosene | |
|---|---|---|
| | 0.1 | 2.5 |
| 30–35 | 64 | 70 |
| 75 | 50–60 | 72 |
| 145–146 | 51 | 74 |

EXAMPLE 3.—COMPARISON OF POLYISOBUTYLENE WITH OTHER POLYMERS

A large number of commercial polymers were screened as potential friction loss additives. Polyacrylonitrile, polyacrylic acid, polysulfide rubber, trans-polybutadiene, trans-polyisoprene, polypropylene, and vulcanized natural rubber were ineffective. Polymers which were found to have some effectiveness are listed in the following table; but note that except for cis-polyisoprene, a synthetic polymer similar in structure to natural rubber, the effectiveness of these materials is low.

| Polymer Type | Percent Reduction in Pressure Drop—Lbs. Polymer/1,000 Gals. Kerosene | | |
|---|---|---|---|
| | 2.5 | 5.0 | 25.0 |
| Polyisobutylene (PIB-1) | 73 | 72 | 60 |
| Cis-Polybutadiene | 6–12 | 8–16 | 15–25 |
| Styrene-Butadiene Rubber | 5–23 | 3–28 | 5–45 |
| Butyl Rubber | 4–11 | 5–17 | 7–23 |
| Polypropylene Oxide | 10 | | 30 |
| Dimethylpolysiloxane | 2–7 | 11 | 18 |
| Polymethylmethacrylate | | | 10–15 |
| Cis-Polyisoprene | 50–60 | 53–60 | 64 |

EXAMPLE 4.—COMPARISON OF POLYISOBUTYLENE AND NATURAL RUBBER

The following data indicate the superiority of polyisobutylene resin to natural rubber as a fluid friction loss reduction additive in hydrocarbon liquids, particularly in regard to:

*(a) Effectiveness at low concentrations*

| Additive | Percent Reduction in Pressure Drop—Lbs./1,000 Gals. Kerosene | | | | | | |
|---|---|---|---|---|---|---|---|
| | 0.01 | 0.05 | 0.1 | 0.25 | 0.5 | 1.0 | 2.5 |
| PIB-1 | 11 | 42 | 60 | 73 | 73 | 73 | 73 |
| Pale Crepe Rubber | 8 | 22 | 30 | 43 | 52 | 60 | 70 |
| Smoked Rubber | | | | | | | 58 |

*(b) Thermal stability of the additive concentrate*

| Storage | | Percent Reduction in Pressure Drop | |
|---|---|---|---|
| Days | T. ° F. | PIB-1* | Pale Crepe Rubber* |
| 0 | 75 | 72 | 70 |
| 1 | 175 | 72 | 56 |
| 3 | 175 | 72 | 38 |
| 7 | 150 | 72 | 41 |

*Test concentration, 2.5 lbs./1,000 gals. kerosene.

*(c) Stability of additive concentrate to accelerated air degradation*

Samples of the concentrated additive solutions were saturated with oxygen, stored at ambient temperature, and then tested in the standard manner.

| Storage Time (Days) | Percent Reduction in Pressure Drop | |
|---|---|---|
| | PIB-1* | Pale Crepe Rubber* |
| 0 | 71 | 71 |
| 3 | 71 | 67 |
| 38 | 71 | 0 |

*Test concentration, 2.5 lbs./1,000 gals. kerosene.

What is claimed is:

1. A process for reducing the fluid flow friction loss in the transmission of a hydrocarbon fluid of the group consisting of hydrocarbon liquids and slurries thereof containing suspended solids, which comprises intermixing with the hydrocarbon fluid from 0.01 to 25 pounds of a solid, high molecular weight polyisobutylene resin per 1,000 gallons of hydrocarbon liquid, said polyisobutylene having a viscosity average molecular weight in the range of 0.7 million to 15 million and transferring the resulting mixture at a velocity sufficient to establish nonlaminar flow as characterized by a generalized Reynolds number between $3 \times 10^3$ and $1 \times 10^7$.

2. The process of claim 1 wherein the solid, high molecular weight polyisobutylene resin is intermixed as a concentrate of the polyisobutylene resin in a hydrocarbon liquid, said concentrate containing from 75 to 450 pounds resin per 1,000 gallons of concentrate.

3. A process for reducing the fluid flow friction loss in the transmission of a hydrocarbon fluid of the group consisting of hydrocarbon liquids and slurries thereof containing suspended solids, which comprises intermixing with hydrocarbon fluid from 1 to 10 pounds of a solid high molecular weight polyisobutylene resin per 1,000 gallons of hydrocarbon liquid, said polyisobutylene having a viscosity average molecular weight in the range of 4 million to 10 million, and transferring the resulting mixture at a velocity sufficient to establish nonlaminar flow as characterized by a generalized Reynolds number between $3 \times 10^3$ and $10^7$.

4. A process for reducing the fluid flow friction loss in pipe line transmission of hydrocarbon liquids which comprises intermixing with the hydrocarbon liquid from 0.01 to 0.45 pound of a solid, high molecular weight polyisobutylene resin per 1,000 gallons of hydrocarbon liquid, said polyisobutylene resin having a viscosity average molecular weight in the range of 4 million to 10 million, and transferring the resulting liquid through a pipe line at a velocity sufficient to establish nonlaminar flow as characterized by a generalized Reynolds number between $3 \times 10^3$ and $10^7$.

References Cited by the Examiner

UNITED STATES PATENTS

| | | | |
|---|---|---|---|
| 2,084,501 | 6/37 | Otto et al. | 252—59 |
| 2,203,873 | 6/40 | Cunradi et al. | 260—94.8 |
| 2,341,500 | 2/44 | Detling | 252—8.55 |
| 2,492,173 | 12/49 | Mysels | 137—13 |
| 2,545,144 | 3/51 | Green et al. | 260—94.8 |
| 2,559,062 | 7/51 | Dornte | 260—94.8 |
| 2,596,844 | 5/52 | Clark | 252—8.55 |
| 2,727,022 | 12/55 | Linsk | 260—94.8 |
| 3,023,760 | 3/62 | Dever et al. | 137—13 |
| 3,036,899 | 5/62 | Schnider | 252—316 |
| 3,105,047 | 9/63 | Miller et al. | 252—8.55 |
| 3,123,592 | 3/64 | Gasparoni et al. | 260—94.8 |

FOREIGN PATENTS 798,015  7/58  Great Britain.

JULIUS GREENWALD, *Primary Examiner.*

UNITED STATES PATENT OFFICE
CERTIFICATE OF CORRECTION

Patent No. 3,215,154                         November 2, 1965

Jerry L. White et al.

It is hereby certified that error appears in the above numbered patent requiring correction and that the said Letters Patent should read as corrected below.

Column 2, line 58, for "hydrogen" read -- hydrocarbon --; column 4, line 2, for "main" read -- mean --.

Signed and sealed this 6th day of September 1966.

(SEAL)
Attest:

ERNEST W. SWIDER
Attesting Officer

EDWARD J. BRENNER
Commissioner of Patents